Figure 1:
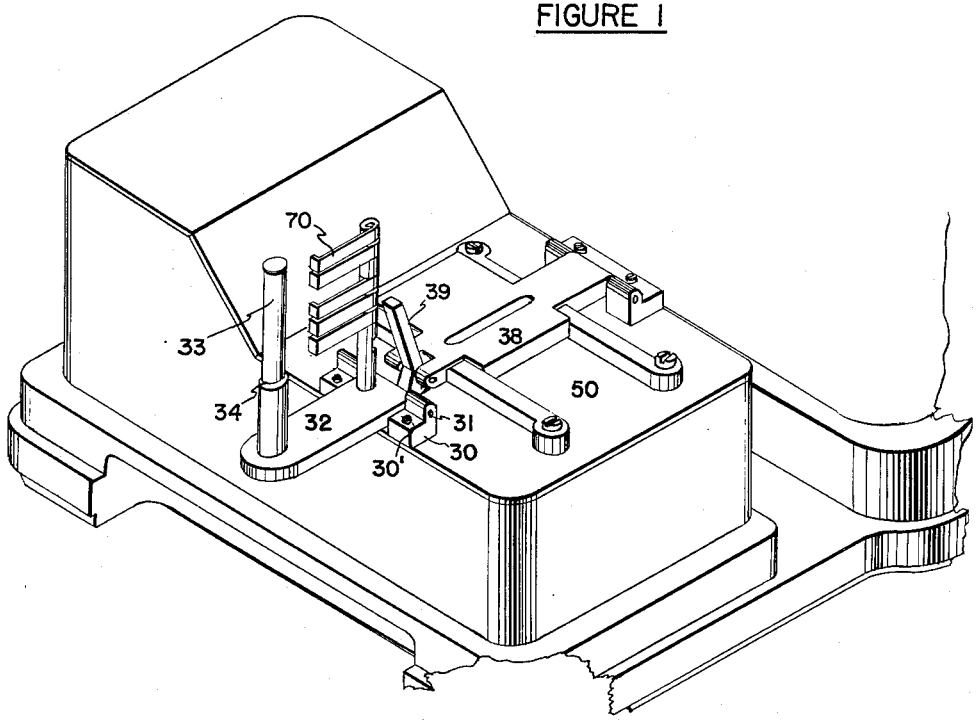

May 9, 1961  D. C. BURKNESS  2,983,788
TEST DEVICE FOR TAPE READERS
Filed June 22, 1956  2 Sheets-Sheet 1
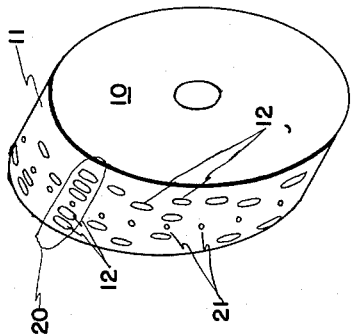
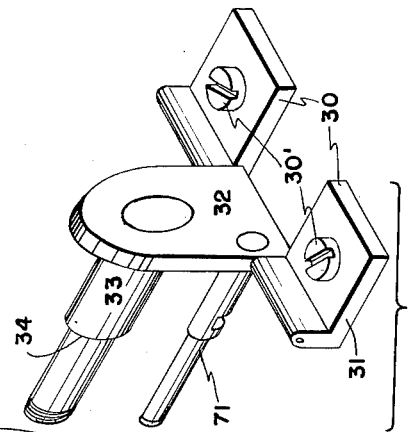
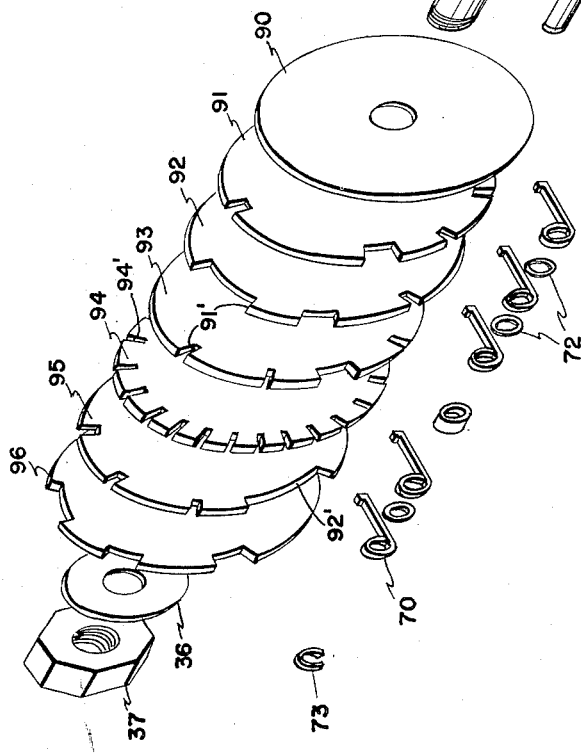
*INVENTOR.*
DONALD C. BURKNESS
BY May 9, 1961

D. C. BURKNESS 2,983,788

TEST DEVICE FOR TAPE READERS

Filed June 22, 1956

2 Sheets-Sheet 2

*INVENTOR.*
DONALD C. BURKNESS
BY

United States Patent Office 2,983,788
Patented May 9, 1961

2,983,788
TEST DEVICE FOR TAPE READERS
Donald Clifford Burkness, 1709 Glenkarney Place, Silver Spring, Md.
Filed June 22, 1956, Ser. No. 593,303
4 Claims. (Cl. 178—17)
(Granted under Title 35, U.S. Code (1952), sec. 266)

The invention described herein may be manufactured and used by or for the Government for governmental purposes without the payment of any royalty thereon.

This invention is broadly in telegraphy apparatus, and specifically is an element of test equipment relating to machine telegraphy.

In the installation and maintenance of teletypewriter equipment it is frequently desirable to test not only the main circuits, but the circuits for the individual type bar magnets as well, and the physical operations, such as printing, etc.

Obviously, some of this can be accomplished, with the machine in "send" condition, by manually running through the alphabet keys in order and then the numeral keys in order, and with the machine in "receive" condition, repeating the procedure with a cooperating test instrument. Actually, it is common practice to utilize a prearranged sentence (for the alphabetic characters), a well-known one being, "The quick brown fox jumped over the lazy dog's back," this containing all the letters of the alphabet; a prearranged sequence of numerical characters also is employed.

When a large amount of testing is in prospect, as is true in the establishment of an entirely new communications link, it further is customary to punch the indicated sentence or other test sequence or sequences on a standard ⅝" paper tape so that it can be inserted in a tape transmitter of known type which can then be operated as many times as desired to send the test message.

One difficulty that arises with this procedure is that the paper tapes are not durable, and after a rather short time will begin to tear in use at the feed holes or at the other perforations; further, of course, the tapes tear readily in course of handling unless considerable care is exercised.

The principal object of this invention is to provide a novel device for sending a standard prearranged message over a teletypewriter circuit.

A second object is to provide a device of the nature mentioned which is virtually foolproof against wear or accidental breakage.

An additional object is to provide a device of the indicated type which is usable with a standard tape transmitter with but minor alternations.

Other objects will be apparent from a reading of the following specification and claims.

Figure 3:
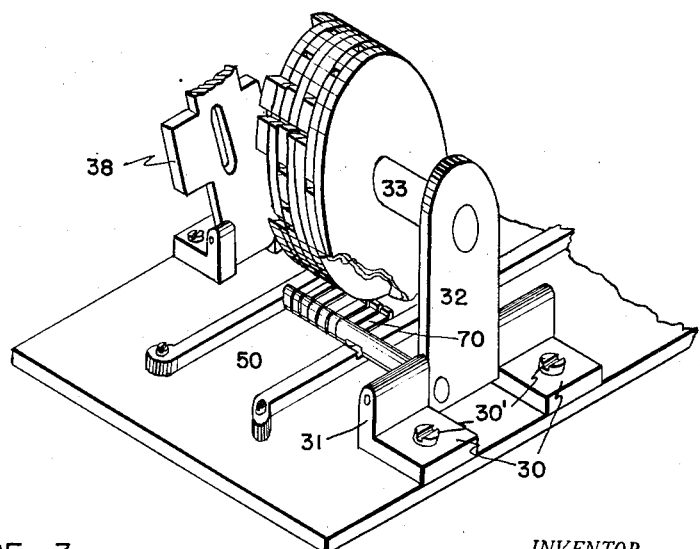

In the drawings:

Figure 1 shows a portion of a tape transmitter of standard type with a part of the equipment of my invention applied thereto; Figure 2 shows one form of the test device proper of my invention; Figure 3 is a view of another form of my novel device in place, with most of the standard parts broken away; and Figure 4 is an exploded view of the test device of Figure 3 and associated parts.

The test device of my invention may take the form of a wheel or disc 10 (see Figure 2), preferably of a tough plastic not susceptible of ready breakage, although it may be made of a light metal such as aluminum.

About the periphery 11 of wheel 10 is formed, by drilling or otherwise, a succession of rows of openings 12, the rows being parallel to each other, with each row being equally spaced from its adjacent rows, all rows extending axially of the wheel. The rows of openings are normally arranged ten to the inch, but this obviously depends upon circumstances.

Considering row 20 of these openings, there will be seen one small opening 21, and five larger openings 12. Actually a small opening (like 21) occurs in each axial row; the larger openings occur in various combinations, or may be altogether absent, but, if present are found in parallel circumferential alignment as well as in parallel axial rows; and the similarity of a succession of these axial rows of openings to the rows of perforations in a strip of paper teletypewriter tape will be obvious.

The openings 21 represent the feed holes in a conventional tape, and the larger openings 12 represent the information-bearing perforations found in such a tape it being assumed that the Baudot alphabet is being utilized. Obviously the invention has application with other permutation codes or, in fact, with Morse code.

For optimum usefulness disc 10 should be mounted on or readily adapted for mounting on a tape transmitter or similar piece of tape reading equipment. To this end bracket members 30 are secured to the machine in any desired fashion adjacent to the reading position, as by screws 30'; and hingedly secured thereto, on hinge 31, is an arm 32. This arm has two normal positions, the first, horizontal and inactive (see Figure 1), and, the second, vertical, for actual operation (see Figures 3 and 4). Detents may be provided in these two positions, but none is shown, and normally none will be required, since the weights and designs of the several parts will tend to retain the parts in their desired positions.

Secured in arm 32, and perpendicular thereto, and spaced from hinge 31 by an amount determined by the radius of wheel 10, is a shaft 33; this may be welded, peened, or screwed into place. Arm 33 is provided with a shoulder 34, and wheel 10 fits upon the reduced portion of shaft 33 and against the shoulder 34 where it may be secured by means of a washer and a nut.

The indicated mounting arrangement for wheel 10 obviously contemplates that the wheel turn upon shaft 33. An equivalent expedient would be to fix the wheel upon the shaft and mount the shaft for rotation in suitable supports. In neither case, because of comparatively low speeds and low pressures, are anti-friction bearings required.

In normal operation of the tape transmitter, arm 32 is in its horizontal position, and wheel 10 is placed on shaft 33 or in some convenient receptacle nearby. With wheel 10 and its cooperating parts thus in their inactive condition, the tape transmitter is used, or is subject to use, with a conventional perforated tape.

If it becomes desirable to initiate a test procedure, the tape retaining gate 38 is lifted by operation of latch 39, and the paper tape (not shown) is removed from the machine; arm 32, with wheel 10 in place on shaft 33, is swung into its active position, whereby wheel 10 falls into the tape guide, the parts being so calculated that the periphery of the wheel then barely clears the surface 50 which normally supports the paper tape. Preliminary design and adjustment must assure that openings 21 in wheel 10 properly register with the teeth of a feed wheel (not shown), and that the circumferential rows of openings 22 are in exact alignment with the tape-reading feeler pins (not shown) of the standard apparatus.

The above conditions being met, the tape transmitter drive mechanism may be started, and the feed wheel, cooperating with openings 21 in wheel 10, will drive the wheel continuously as long as desired, repeatedly sending the prepared test message.

It may be mentioned that in the preferred embodiment of the invention, wheel 10 is of the order of 2½ inches in diameter. Obviously, such a wheel can be made of any size (to send any length message) except to the extent that adjacent structure may limit its size. Dependent somewhat upon its size and thus the curvature of its preiphery, and also upon the design of the particular tape transmitter being utilized, particularly the horizontal distance between the feed wheel and the reading pins, it may sometimes happen that openings 12 may be spaced vertically too far from the pins to be read properly thereby. In this case, resort may be had to the use of supplemental pins, as 70, preferably mounted loosely upon a shaft 71, in turn secured to arm 32, and properly oriented with respect to openings 12 and the standard feeler pins. Spacers 72 and a keeper 73 may be employed. The function of the supplemental pins is believed to be apparent. Each time the standard pins are urged upwardly for a sensing operation, they immediately abut against their superimposed cooperating supplemental pins, and force them upwardly whereupon they perform the actual reading of the disc. The recognition mechanism of the basic machine of course requires no alteration. The supplemental pins may of course be spring-loaded, if desired, to provide a positive return to non-reading condition, but normally this expedient is unnecessary.

In Figures 3 and 4 may be seen a modified form of my invention. In this embodiment, the integral structure 10 is replaced by a laminated wheel consisting of seven disc elements 90 through 96. Disc 94 is formed, preferably by stamping, with a periphery 94' of regular notched design, while discs 91, 92, 93, 95 and 96 are formed with peripheries irregularly notched (see 91', for example), and disc 90 includes no notches whatever around its circumference.

It is believed that the operation of the structure of Figure 3 will be largely apparent. In practice, all discs are mounted upon shaft 33, where they are secured firmly together in any convenient fashion, as by washer 36 and nut 37. The thicknesses of the several discs (excepting disc 90) are so selected, and the wheels are so mounted, that disc 94 registers exactly with the feed wheel of the basic apparatus, and each of the wheels 91, 92, 93, 95 and 96 registers exactly with one of the several tape sensing pins. Wheel 90 is in the nature of a camming device, and serves the purpose of depressing the end-of-tape indicator (not shown) generally found on tape readers. When such an indicator is not depressed, the cooperating equipment ordinarily is stopped. Obviously, the indicator, normally taking the form of a protruding button or finger, can be depressed or disabled in other fashions.

Referring more specifically to several peripheral designs, the larger notches result from stamping out a segment, instead of a succession of small notches, whenever the indicated condition obtains. In function, a long notch, as 92', is the equivalent of, for example, 3 successive small, spaced, notches.

Discs 90 through 96 may of course be secured together in any convenient fashion, and mounted as a unit on shaft 33 instead of being placed individually on the shaft and secured together by the same means that secure them to the shaft.

The foregoing is in specific terms and many modifications will suggest themselves; for the true scope of the invention, therefore, reference should be had to the appended claims.

I claim:

1. A device of the nature described for use with a tape reader having tape sensing pins, a feed wheel, and an end-of-tape indicator having a first position and a depressed position, including a wheel composed of an assembly of relatively thin discs, the periphery of each disc being notched in accordance with the marking and spacing conditions of a particular level in a succession of permutation code characters, another disc the periphery thereof being notched in accordance with a regular pattern and a further disc the periphery thereof being unnotched, the proportions of said other disc and the notches thereof being such as to cooperate with said feed wheel and the proportions of said further disc being such as to cooperate with said end of tape indicator to depress the same, the proportions of the remaining discs and the notches thereof being such as to cooperate individually with said tape sensing pins when said wheel is rotated in proper juxtaposition therewith.

2. A test device for use in conjunction with a tape reader that includes tape-sensing and tape-feeding means, which comprises a cylindrical member having openings in the periphery thereof which simulate perforations in a message tape, and means for mounting the cylindrical member between an operative position and an inoperative position, the last-mentioned means comprising an arm secured pivotally to the tape reader at one end thereof, a shaft secured to the arm near the second end of the arm, and means for securing the cylindrical member to the shaft such that rotation of the cylindrical member thereon is permitted, the pivotal mounting of the arm permitting the cylindrical member to be moved between its inoperative position, to permit the sensing and feeding means of the tape reader to perform their normal functions of reading and feeding tape, and its operative position, wherein the openings in the periphery of the cylindrical member are placed in substantially the same position relative to the sensing and feeding means of the tape reader as are the perforations in a tape during a tape-reading operation and wherein the feeding means of the tape reader causes rotation of the cylindrical member.

3. A test device for use in conjunction with a tape reader wherein the tape reader includes a plurality of sensing pins which normally sense perforations made in a message tape according to a code and a feed wheel which normally advances the tape by cooperating with further perforations in the tape, which comprises a cylindrical member having formed therein a first plurality of openings which simulate tape perforations made according to a code and a second plurality of openings which simulate the further perforations made in the tape for tape-advancing purposes, and means for supporting the cylindrical member rotatably and between an inoperative position and an operative position, the last-mentioned means comprising a shaft on which the cylindrical member is mounted for rotation, an arm, means for securing the shaft near a first end of the arm, and hinge means for securing the second end of the arm pivotally, the pivotal mounting of the arm permitting the cylindrical member to be moved between its inoperative position, wherein the tape reader can be used for its normal function of reading the perforations in a tape, and its operative position, wherein the openings of the cylindrical member are placed in substantially the same position with respect to the tape reader sensing pins and feed wheel as are the perforations in a tape which they simulate.

4. A test device for use in conjunction with a tape reader wherein the tape reader includes a plurality of sensing pins which normally sense perforations made in a message tape according to a code having a predetermined number of levels and a feed wheel which normally advances the tape by cooperating with further perforations in the tape, which comprises a cylindrical structure formed by a plurality of discs, each of the discs having notches formed around the periphery thereof to simulate either one level of code perforations in a tape or the further tape-advancing perforations, and means for mounting the cylindrical structure rotatably and between an inoperative position so that the tape reader can read a message tape and an operative position so that the notches in the discs simulate a tape to be read by the tape reader, the last-mentioned means comprising an arm mounted pivotally at one end thereof to the tape reader, a shaft secured to the arm near the second end thereof, and means for securing the cylindrical member to the shaft rotatably, the pivoting of the arm to place the cylindrical member in the operative position being such that the notches in each disc simulating a level of code perforations in a tape are placed in substantially the same position with respect to one of the sensing pins of the tape reader as the perforations in the associated level of the tape are normally located during a tape-reading operation, and such that the notches in the disc simulating the tape-feeding perforations in a tape are placed in substantially the same position with respect to the feed wheel of the tape reader as the further tape-advancing perforations of the tape are normally located during a tape-reading operation.

References Cited in the file of this patent

UNITED STATES PATENTS

| | | |
|---|---|---|
| 1,965,121 | Kardorff | July 3, 1934 |
| 2,194,705 | Lang | Mar. 26, 1940 |
| 2,468,462 | Rea | Apr. 26, 1949 |
| 2,619,532 | Bladgett | Nov. 25, 1952 |
| 2,651,676 | Moser | Sept. 8, 1953 |
| 2,689,343 | MacKay | Sept. 14, 1954 |
| 2,797,260 | Roschke | June 25, 1957 |

FOREIGN PATENTS

| | | |
|---|---|---|
| 1,023,388 | France | Mar. 18, 1953 |
| 1,095,316 | France | June 1, 1955 |